(12) United States Patent
Blouin et al.

(10) Patent No.: US 10,101,767 B2
(45) Date of Patent: Oct. 16, 2018

(54) POWERED ELECTRONIC DISPLAY AWNING

(71) Applicant: Genesco Sports Enterprises, Inc., Dallas, TX (US)

(72) Inventors: Todd Blouin, Dallas, TX (US); Terry Pugh, Paradise Valley, AZ (US); Marc Meadows, Fort Worth, TX (US)

(73) Assignee: Genesco Sports Enterprises, Inc., Dallas, TX (US)

( * ) Notice: Subject to any disclaimer, the term of this patent is extended or adjusted under 35 U.S.C. 154(b) by 0 days.

(21) Appl. No.: 15/490,582

(22) Filed: Apr. 18, 2017

(65) Prior Publication Data
US 2017/0235330 A1   Aug. 17, 2017

(51) Int. Cl.
| | | |
|---|---|---|
| *E04F 10/00* | (2006.01) | |
| *E04H 15/58* | (2006.01) | |
| *G06F 1/16* | (2006.01) | |
| *G09F 19/22* | (2006.01) | |

(52) U.S. Cl.
CPC .......... *G06F 1/1601* (2013.01); *E04F 10/005* (2013.01); *E04H 15/58* (2013.01); *G09F 19/22* (2013.01); *G09F 2019/221* (2013.01)

(58) Field of Classification Search
CPC .... G09F 19/22; G09F 2019/221; E04H 15/58
USPC ...................................... 361/679.04–679.07
See application file for complete search history.

(56) References Cited

U.S. PATENT DOCUMENTS

| | | | | | |
|---|---|---|---|---|---|
| 4,117,876 | A * | 10/1978 | Bennett | .................. | B60P 3/343 135/88.12 |
| 4,782,615 | A * | 11/1988 | Futatsuishi | ............. | B60R 13/00 40/524 |
| 5,537,127 | A * | 7/1996 | Jingu | ..................... | A47B 21/00 248/921 |
| 6,273,172 | B1 * | 8/2001 | Frey | .................... | E04F 10/0614 135/88.12 |
| 6,402,109 | B1 * | 6/2002 | Dittmer | .................. | F16M 11/10 248/279.1 |
| 6,437,974 | B1 * | 8/2002 | Liu | ........................... | G09F 9/35 248/917 |
| 6,554,238 | B1 * | 4/2003 | Hibberd | ............... | A47B 81/061 248/278.1 |
| 6,633,276 | B1 * | 10/2003 | Jaynes | ................. | F16M 11/126 248/923 |
| 6,966,617 | B2 * | 11/2005 | Chen | ................. | G02F 1/133308 312/7.2 |
| 7,337,024 | B1 * | 2/2008 | Graham | ............... | A47B 81/061 160/239 |
| 8,091,842 | B2 * | 1/2012 | Thomas | ............... | F16M 11/046 248/125.8 |

(Continued)

Primary Examiner — Adrian S Wilson
(74) Attorney, Agent, or Firm — Merchant & Gould P.C.

(57) ABSTRACT

An awning includes an electronic display panel frame that has a front end and a rear end. The rear end is pivotally attached to a fixed surface at a pivot location. The awning includes at least one lift mechanism that is pivotally connected to the electronic display panel frame and to a fixed mount surface. The at least one left mechanism selectively pivots the electronic display panel frame about the pivot location between a raised position and a lowered position. When in the raised position, the front end of the electronic display panel frame is positioned at a greater distance from a ground surface than the front end of the electronic display panel frame when positioned in the lowered position.

21 Claims, 7 Drawing Sheets

(56) References Cited

U.S. PATENT DOCUMENTS

| | | | | |
|---|---|---|---|---|
| 8,094,438 B2* | 1/2012 | Dittmer | ............. | F16M 11/10 248/125.7 |
| 8,300,393 B2* | 10/2012 | Mathews | ............. | A61H 5/00 361/679.21 |
| 8,482,906 B2* | 7/2013 | Farley, Jr. | ............. | E05D 3/022 16/103 |
| 8,492,645 B1* | 7/2013 | Strahm | ............. | F24J 2/5424 126/600 |
| 9,109,742 B2* | 8/2015 | Smith | ............. | F16M 11/10 |
| 9,778,707 B1* | 10/2017 | San Clemente | ............. | G06F 1/182 |
| 2004/0123782 A1* | 7/2004 | Korber | ............. | A47B 21/0073 108/50.01 |
| 2005/0060921 A1* | 3/2005 | Glynn | ............. | G09F 21/04 40/591 |
| 2005/0168661 A1* | 8/2005 | Maxson | ............. | H04N 5/64 348/825 |
| 2007/0177339 A1* | 8/2007 | Flessas | ............. | G06F 1/1601 361/679.06 |
| 2007/0240347 A1* | 10/2007 | Chang | ............. | G09F 15/0087 40/601 |
| 2008/0062626 A1* | 3/2008 | Ryman | ............. | G09F 7/002 361/679.01 |
| 2008/0136658 A1* | 6/2008 | Brask | ............. | G09F 7/22 340/815.4 |
| 2008/0165481 A1* | 7/2008 | Kirschner | ............. | A47B 81/064 361/679.07 |
| 2009/0128729 A1* | 5/2009 | Dunn | ............. | G02F 1/133385 349/161 |
| 2009/0129021 A1* | 5/2009 | Dunn | ............. | H05K 7/20972 361/699 |
| 2009/0161302 A1* | 6/2009 | Ferren | ............. | B60K 35/00 361/679.01 |
| 2009/0231807 A1* | 9/2009 | Bouissiere | ............. | H05K 7/20972 361/690 |
| 2010/0122777 A1* | 5/2010 | Gutierrez | ............. | E04F 10/0603 160/59 |
| 2011/0058326 A1* | 3/2011 | Idems | ............. | G09F 9/30 361/679.21 |
| 2012/0023792 A1* | 2/2012 | Tryk | ............. | G09F 19/22 40/541 |
| 2012/0073169 A1* | 3/2012 | Boltz | ............. | G09F 15/0025 40/603 |
| 2012/0272584 A1* | 11/2012 | Bilsen | ............. | E04H 3/28 52/7 |
| 2013/0329363 A1* | 12/2013 | Dunn | ............. | G06F 1/1601 361/694 |
| 2014/0352757 A1* | 12/2014 | Ramirez | ............. | H02S 20/30 136/246 |
| 2016/0295176 A1* | 10/2016 | Jeong | ............. | G09G 3/00 |

* cited by examiner

POWERED ELECTRONIC DISPLAY AWNING

BACKGROUND

Awnings or canopies are known to be used to cover a portion of a ground surface to provide shade, privacy and/or improve the overall appearance of building.

In arenas, awnings or tunnel covers are often used to provide cover over a portion of the entrance tunnel area to provide a private staging area. This staging area allows groups, such as a team, to gather before entering the arenas. However, these awnings often restrict, or make it cumbersome, to transport items that have a height higher than the lowest height of the awning into the arena through the tunnel. Often, awnings have to be deconstructed or manually lifted to accommodate such items.

Further, these tunnel covers in arenas are often positioned so that they are highly visible to a large portion of the crowd and often in the camera shot of events occurring in the main area of the arena. Therefore, this presents a very valuable advertisement area. However, because the awning needs to be flexible to facilitate deconstruction, the tunnel covers are often constructed of a lightweight canvas-type material, thereby limiting advertisements to those that are printed on the tunnel cover. Therefore, to change the advertisers, the tunnel cover must either be replaced or reprinted. Therefore, improvements in awnings, specifically tunnel covers, are needed.

SUMMARY

The present disclosure relates generally to a powered electronic display awning. In one possible configuration, and by non-limiting example, the powered electronic display awning includes a pivoting electronic display panel.

In one aspect of the present disclosure, an awning is disclosed. The awning includes an electronic display panel frame that has a front end and a rear end. The rear end is pivotally attached to a fixed surface at a pivot location. The awning includes at least one lift mechanism that is pivotally connected to the electronic display panel frame and to a fixed mount surface. The at least one left mechanism selectively pivots the electronic display panel frame about the pivot location between a raised position and a lowered position. When in the raised position, the front end of the electronic display panel frame is positioned at a greater distance from a ground surface than the front end of the electronic display panel frame when positioned in the lowered position.

In another aspect of the present disclosure, a movable display is disclosed. The movable display includes an electronic display panel that has a top side, an underside, a front end, and a rear end. At least the top side of electronic display panel is configured to display computer generated media. The movable display includes an electronic display panel frame that is attached to the underside of the electronic display panel. The electronic display panel frame is pivotally attached to a fixed surface at a pivot location adjacent the rear end of the electronic display panel. The movable display includes a pair of lift mechanisms that are pivotally connected to the electronic display panel frame at first ends. Each lift mechanism is pivotally connected to a fixed mount surface at second ends.

In another aspect of the present disclosure a method of operating an awning is disclosed. The method includes positioning an electronic display panel generally horizontal over a ground surface. The method includes displaying computer generated media on the electronic display panel. The method includes pivoting the electronic display panel between a lowered position and a raised position, wherein, when in the raised position, at least a portion of the electronic display panel is positioned at a greater distance from the ground surface than when the electronic display panel is positioned in the lowered position.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
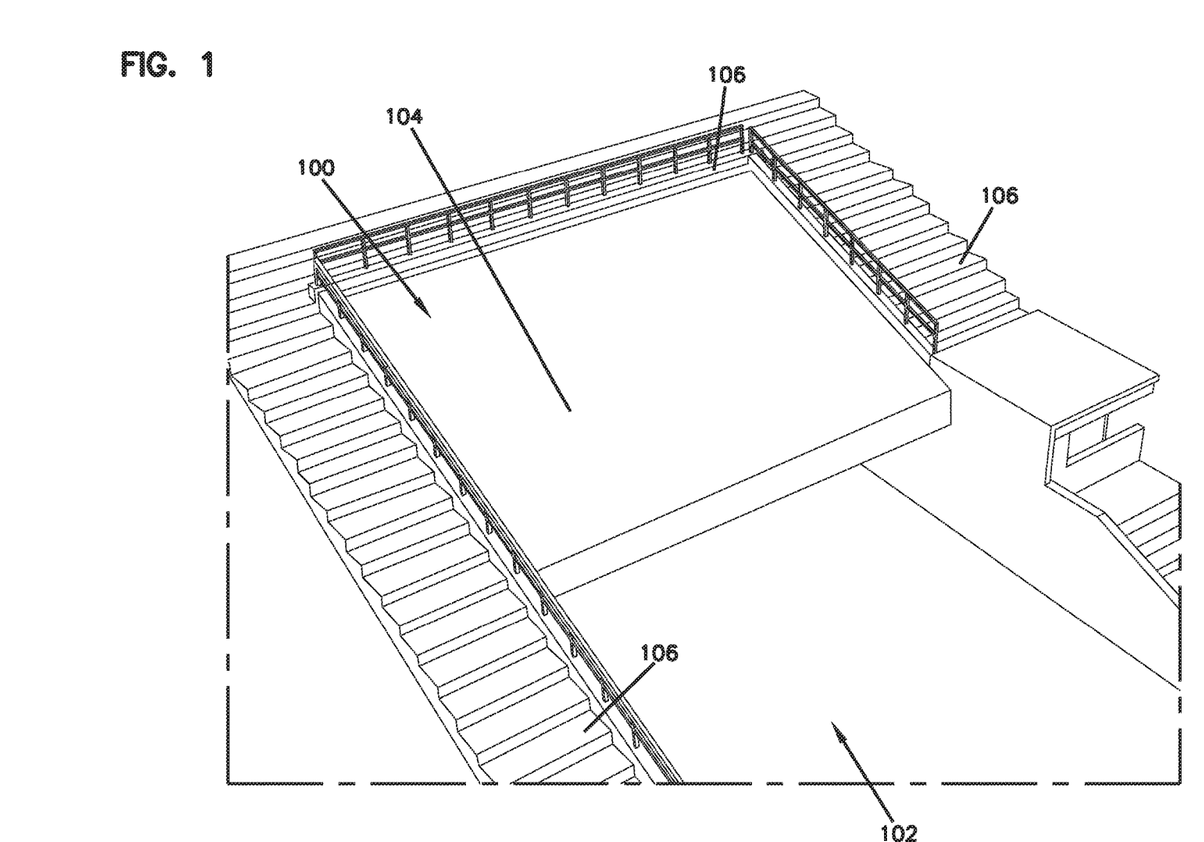
FIG. 1 illustrates a perspective view of an awning positioned over a passageway in a lowered position, according to one embodiment of the present disclosure.

FIG. 1 shows a powered awning 100 positioned over a passageway 102. The awning 100 is pivotally positioned over the passageway 102 so as to provide at least partial horizontal coverage of the passageway 102 while not obstructing the passageway 102. In some examples, the passageway 102 and awning 100 can be either inside of a building (e.g., an indoor arena) or outdoors (e.g. an outdoor stadium).

The passageway 102 can provide a pathway to an interior area, such as a storage area or a concourse, via a doorway (as will be shown and discussed in FIGS. 3-6) positioned under the awning 100. In other examples, the passageway 102 provides a pathway via a doorway underneath a raised fixed structure 106, such as an area of seating. In other examples still, the passageway 102 can be a storage area, having no doorway.

The awning 100 includes an electronic display panel 104 attached thereto. The electronic display panel 104 is configured to display computer generated media, such as videos and image. In other examples, the electronic display panel is configured to emit sound via integrated speakers (not shown).

Figure 2:
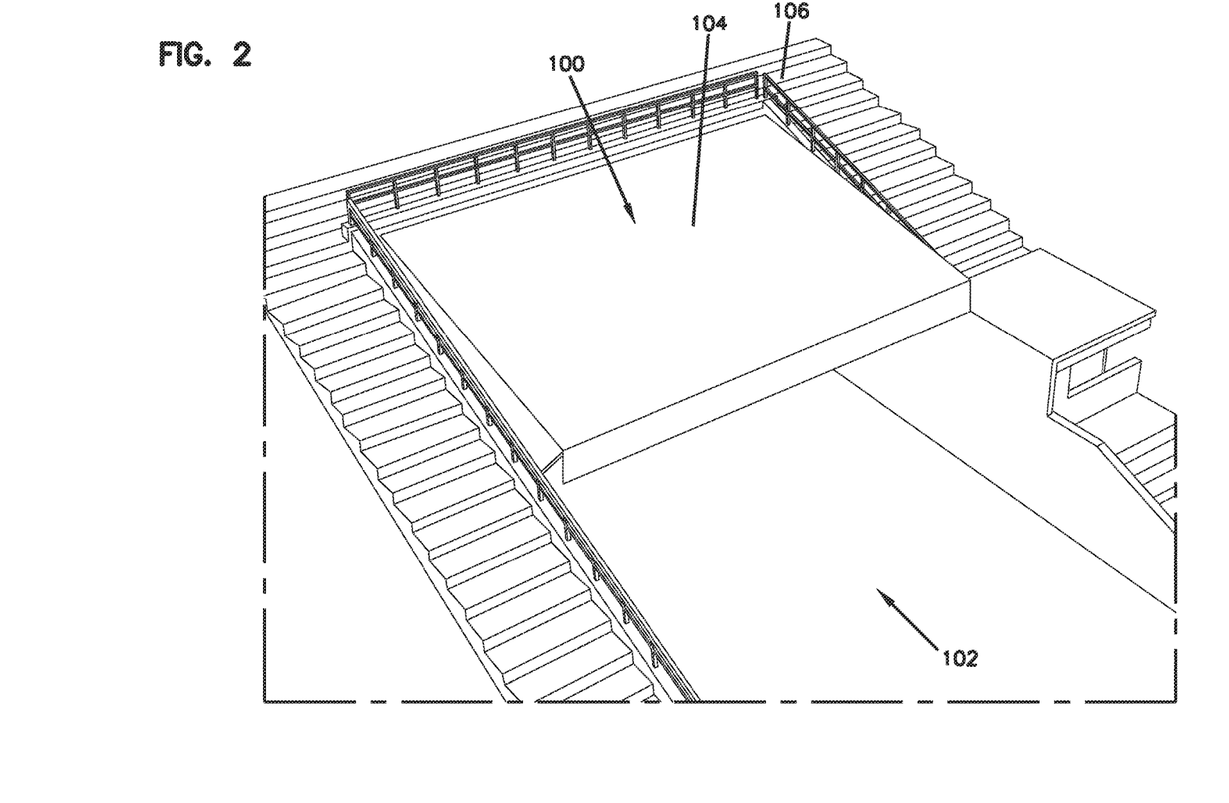
FIG. 2 illustrates a perspective view of the awning of FIG. 1 in a raised position over the passageway.

FIG. 1 shows the awning 100 in a lowered position, and FIG. 2 shows the awning 100 in a raised position. The awning 100 can be positioned between the lowered position and the raised position to provide optimum viewing angles of the electronic display panel 104 for the public in the immediate vicinity of the awning 100. Further, the awning 100 can be positioned between the lowered position and the raised position so as to allow items of varying heights to be passed beneath the awning 100, within the passageway 102. For example, the awning 100 can be positioned so that the awning's lowest height when in the raised position is equal to greater than the doorway height.

Figure 3:
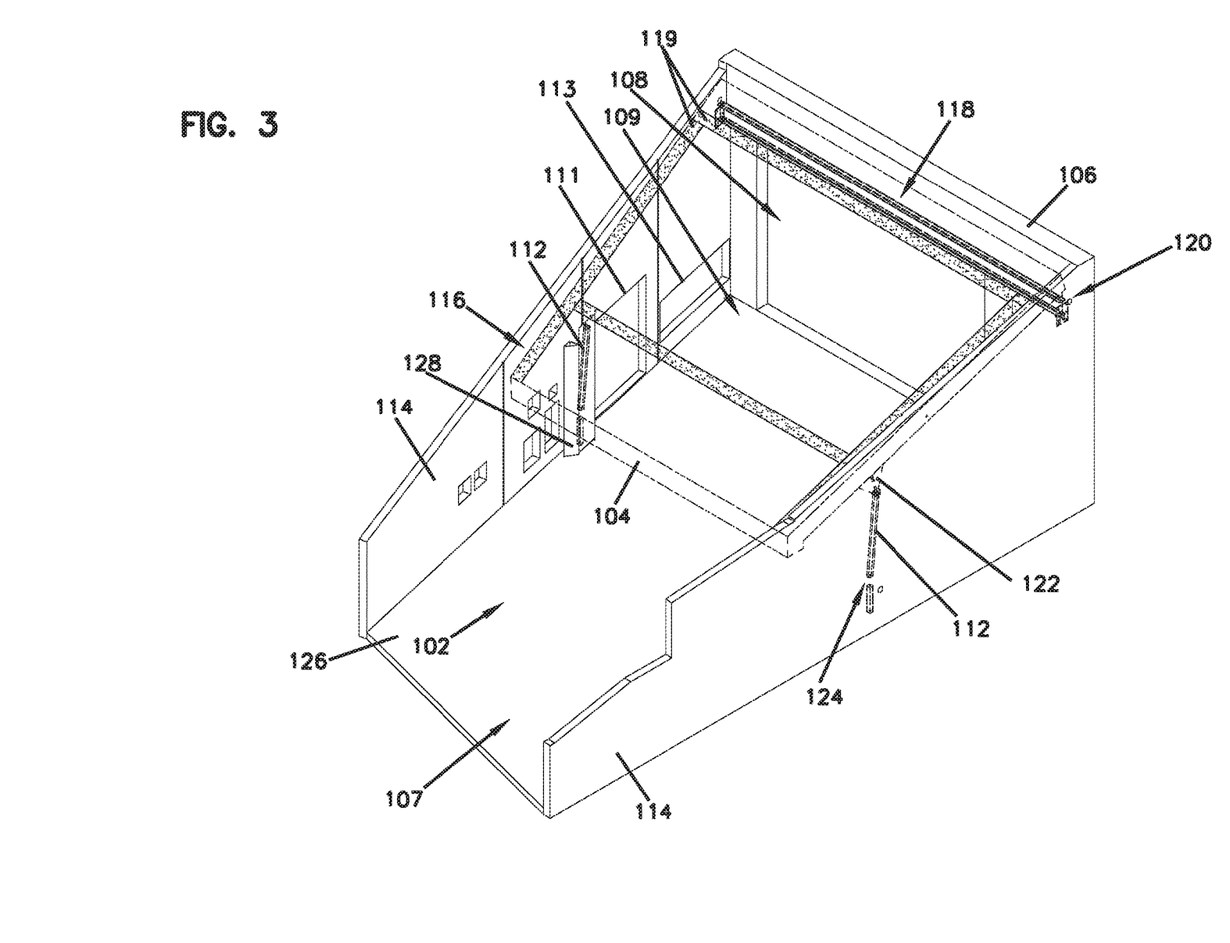
FIG. 3 illustrates a perspective schematic view of the awning of FIG. 1 in a lowered position over the passageway.
Figure 4:
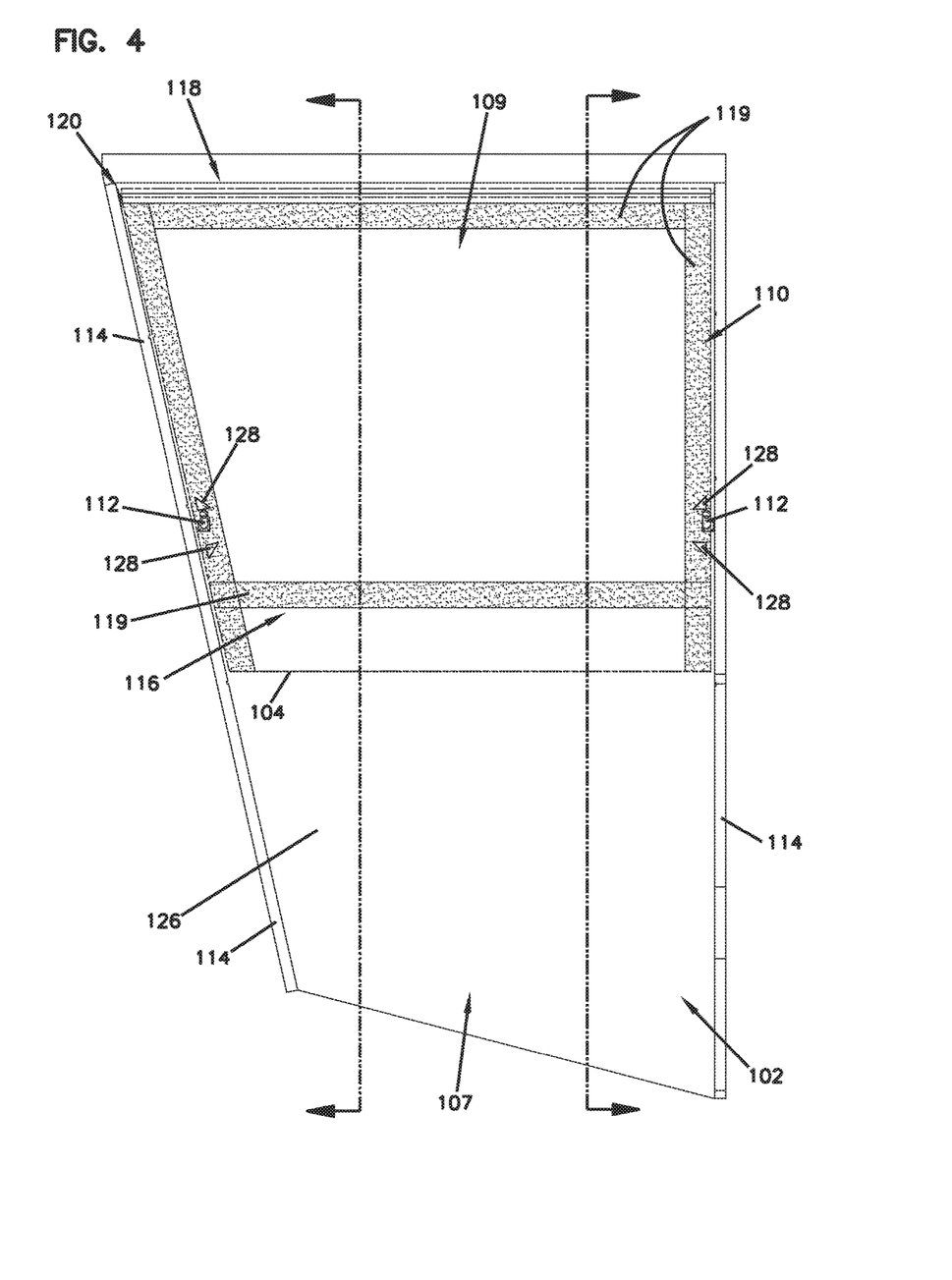
FIG. 4 illustrates a schematic top view of the awning of FIG. 1.

FIG. 3 shows a perspective schematic view of the awning 100 positioned in the passageway 102. FIG. 4 shows a top schematic view of the awning 100 positioned in the passageway 102. The passageway 102 includes a doorway 108 at a rear portion 109, opposite a front portion 107. For illustrative purposes, the electronic display panel 104 is shown as transparent. The awning 100 also includes an electronic display panel frame 110 and a pair of lift mechanisms 112.

In FIG. 4, the passageway 102 is shown to have a tapered configuration, i.e., the passageway 102 has a greater width between opposing walls 114 at the rear portion 109 as compared to the width at the front portion 107. The passageway 102 can have variety of different configurations and constructions. In some examples, the passageway 102 has a consistent, uniform width between the walls 114 from the front portion 107 to the rear portion 109. In other examples, the passageway 102 includes additional doorways 111 and windows 113 positioned within the walls 114.

The electronic display panel frame 110 is configured to receive the electronic display panel 104 for mounting thereto. The electronic display panel frame 110 includes a front end 116 and a rear end 118. The rear end 118 is positioned in closer proximity to the rear portion 109 of the passageway 102, specifically the doorway 108. In some examples, the rear end 118 is pivotally attached to the fixed structure 106 at a pivot location 120 positioned above the doorway 108 of the passageway 102.

The electronic display panel frame 110 further includes a plurality of support members 119 for supporting the weight of the electronic display panel 104. In some examples, the support structures span the majority of the width of the of the passageway 102. The support structures are also configured to be positioned so as to span the distance between the front end 116 and the rear end 118 of the electronic display panel frame 110. In some examples, the support members 119, by themselves, do not provide a covered, private area in the passageway 102 under the awning 100. In some examples, the support members 119 can be constructed of steel, aluminum, or other similar material.

The electronic display panel frame 110 also includes flanges 122 positioned opposite one another at sides of the electronic display panel frame 110, adjacent the walls 114 of the passageway 102. The flanges 122 provide an attachment point for the lift mechanisms 112. In the depicted example, the flanges 122 are positioned on the electronic display panel frame 110 at a point closer to the front end 116 than the rear end 118. However, in other examples, the flanges 122 can be positioned at the sides of on the electronic display panel frame 110 at any location between the front end 116 and the rear end 118. The flanges 122 are at attached to and extend below the support members 119 of the electronic display panel frame 110.

The lift mechanisms 112 are configured to selectively extend and shorten to provide the lifting force to the electronic display panel frame 110 so as to pivot the awning 100 about the pivot location 120 between the lowered and raised positions. In some examples, the awning 100 includes a single lift mechanism 112. In other examples, the awning 100 includes more than two lift mechanisms 112. The lift mechanisms 112 can be, but are not limited to, pneumatic actuators, hydraulic actuators, electromagnetic actuators, rack and pinion gears, or other similar mechanism.

The lift mechanisms 112 are positioned at the sides of the awning 100 so as to not obstruct the passageways 102. The lift mechanisms 112 are each attached to mounting surfaces at opposing ends. The mounting surfaces include the electronic display panel frame 110, specifically the flanges 122, and also a fixed mount surface 124 within the passageway 102. In some examples, the fixed mount surfaces 124 within the passageway 102 can be ground (i.e., floor) surfaces 126. In other examples, the fixed surfaces 124 can be raised surfaces attached to the ground surface 126. In other examples still, the fixed surfaces 124 can be the walls 114 of the passageway 102. The lift mechanisms 112 will be discussed in more detail with respect to FIGS. 5-7.

In some examples, the awning 100 includes lift mechanism guards 128 that are positioned adjacent the lift mechanisms 112, shown in FIGS. 3 and 4. The lift mechanism guards 128 are configured to protect the lift mechanisms 112 from accidental damage and also to help protect against unintended contact with persons congregating and moving within the passageway 102. In some examples, the lift mechanism guards 128 surround and encase each of the lift mechanisms 112. In such examples, plastic, metal, or other similar material can be used to manufacture the lift mechanism guards 128. In other examples, the lift mechanism guards 128 are rubberized bumpers positioned adjacent the lift mechanisms 112.

Figure 5:
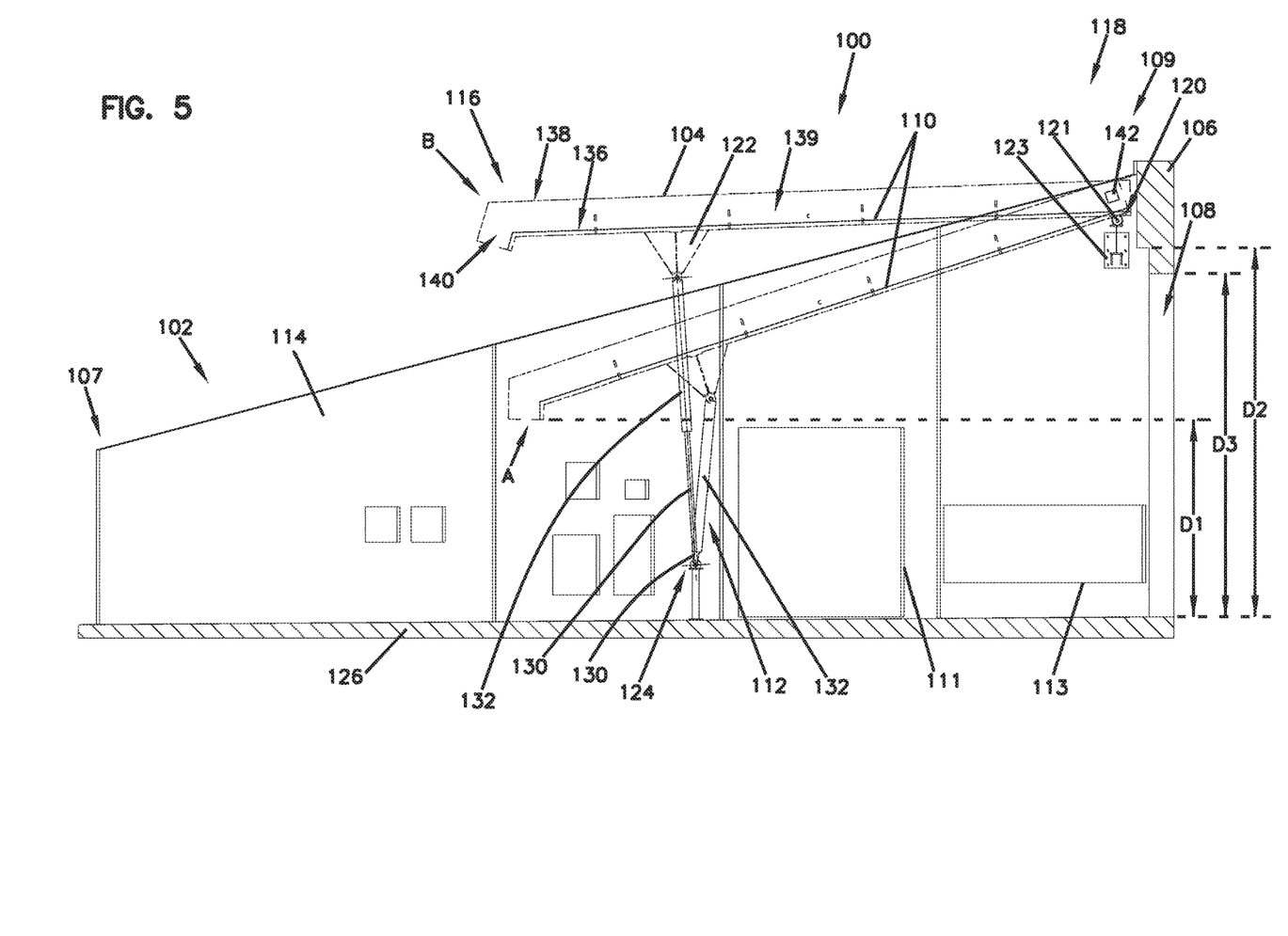
FIG. 5 illustrates a schematic side view of the awning of FIG. 1 positioned over the passageway.
Figure 6:
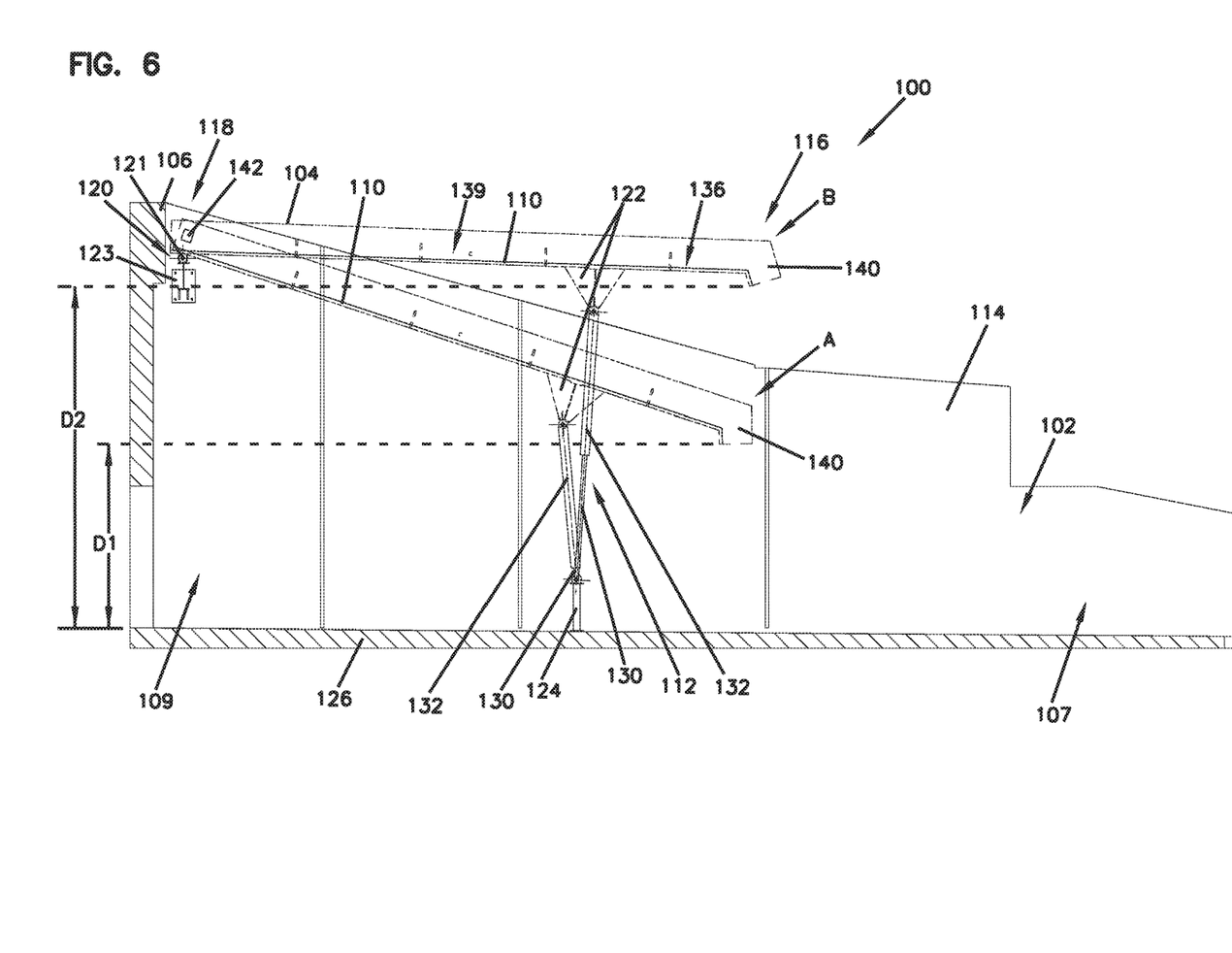
FIG. 6 illustrates a schematic side view of the awning of FIG. 1 positioned over the passageway.

FIGS. 5 and 6 show side views of the passageway 102 with the awning 100 pivotally positioned therein. The awning 100 is shown via dotted lines in the lowered position A and the raised position B.

In the depicted example, each lift mechanism 112 includes a piston rod 130 and a cylinder 132. The piston rod 130 is movable within the cylinder 132 so as to extend and shorten the lift mechanism 112. Such movement of the piston can be controlled in a variety of different ways such as by hydraulic fluid, pressurized air (gas), or electric current. The control system for the lift mechanisms 112 will be described in more detail in FIG. 7.

The lift mechanisms 112 can be pivotally mounted to the flanges 122, the fixed mount surfaces 124, or both. As shown, the fixed mount surface 124 is a raised surface from the ground surface 126. As the awning 100 moves from the lowered position to the raised position, as shown in FIGS. 5 and 6, the end of the lift mechanism 112 that is attached to the flange 122 moves closer to the front portion 107 of the passageway. Depending on the mounting location of the lift mechanism 112 along the electronic display panel frame 110, this rotational motion can be altered. In the depicted example, the rotational motion allows the lift mechanism and electronic display panel frame 110 to move smoothly when the awning 100 is pivoted about the pivot location 120.

In the depicted example, as the lift mechanisms 112 move the awning 100 between the lowered and raised positions, the lift mechanisms 112 extend and rotate about the flange 122 and the fixed mount surface 124. Such rotation can be accomplished by a bearing, ball joint, or similar rotational device mounted at the mounting locations (i.e., either at the flange 122, fixed mount surface 124, or both).

In other examples, the lift mechanisms 112 can be fixedly mounted at either the flange 122 or the fixed mount surface 124, and slidably mounted at the opposite mounting location. Such slidable mounting can include a track and rollers (not shown) located at the mounting surface so as to allow the lifting mechanism 112 to slide along a length, traveling between the front end 116 and the rear end 118, and vice versa.

The pivot location 120 is configured to allow the electronic display panel frame 110 to pivot smoothly about the fixed structure 106. In some examples, the pivot location 120 includes a hinge 121 attached between the electronic display panel frame 110 and the fixed surface 106. In some examples, the hinge 121 is attached to a fixed beam 123 that is secured to the walls 114 of the passageway 102.

As discussed above, the electronic display panel 104 is attached to the electronic display panel frame 110 so as to facilitate the pivoting movement of the electronic display panel 104. The electronic display panel frame 110 is positioned in a generally horizontal orientation with the ground 126 and can be adjusted so to be positioned at different angles with the ground when the awning 100 is moved between the lowered position and the raised position.

The electronic display panel frame 110 is attached to the electronic display panel 104 at an underside 136 of the electronic display panel 104. The electronic display panel 104 is configured to display computer generated media at least at a top side 138, opposite the underside 136. In other examples, electronic display panel 104 can display computer generated media at the sides as well.

In some examples, the electronic display panel 104 includes a main body 139 and an overhang 140 adjacent the front end 116 of the electronic display panel frame 110. In some examples, the main body 139 and overhang 140 are both configured to display computer generated media. In some examples, the overhang 140 and main body 139 can operate as a single panel, showing either mirrored images (or videos) on both the overhang 140 and the main body 139 or showing a single image (or video) bridging across the overhang 140 and the main body 139. In other examples, the overhang 140 and the main body 139 can operate as two completely separate panels, showing different independent images (or videos).

The electronic display panel 104 can be a variety of different types of electronic display panels known in the art. For example, the electronic display panel 104 can be a flat panel display incorporating technology such as light emitting diodes (LEDs), a Liquid Crystal display (LCD), an Organic LED (OLED), a Cold Cathode Fluorescent Lamp (CCFL), or other similar technology. In one example, the electronic display panel 104 can utilize an LED array having a range of image definitions (such as SD, HD, etc.).

In other examples, the electronic display panel 104 includes an integrated processor for processing data signals from a computer located at a remote location away from the electronic display panel 104. In other examples, the electronic display panel 104 has an anti-glare coating. In still other examples, the electronic display panel 104 is weatherproof so as to resist water and fluctuating temperatures.

The electronic display panel 104 can receive power and data signals at a port 142 adjacent the rear end 118 of the electronic display panel frame 110. In other examples, data and power cables can be carried by the electronic display panel frame 110 and can be connected to the electronic display panel 104 at the underside 136 of the electronic display panel 104.

With continued reference to FIGS. 5 and 6, when in the raised position, at least a portion of the awning 100 is positioned at a greater distance from a ground surface 126 than when in the lowered position. Specifically, when in the lowered position, the front end 116 of the electronic display panel frame 110 is positioned above the ground 126 at a distance of D1. When in the raised position, the front end 116 of the electronic display panel frame 110 is positioned above the ground 126 at a distance of D2. Because the awning 100 pivots about the pivot location 120 at the rear end 118, D2 is always greater than D1. In some examples, the doorway 108 of the passageway 102 has a height of D3 from the ground 126. So as to facilitate moving equipment along the passageway 102 having a height similar to that of the doorway 108, D2 can also be equal to or greater than D3. This allows the awning 100 to be positioned in a lowered position to provide a covered meeting area in the passageway 102 and to maximize viewing angles of the electronic display panel 104 while also having the ability to raise to the raised position, at least momentarily, to allow tall equipment to pass underneath.

Figure 7:
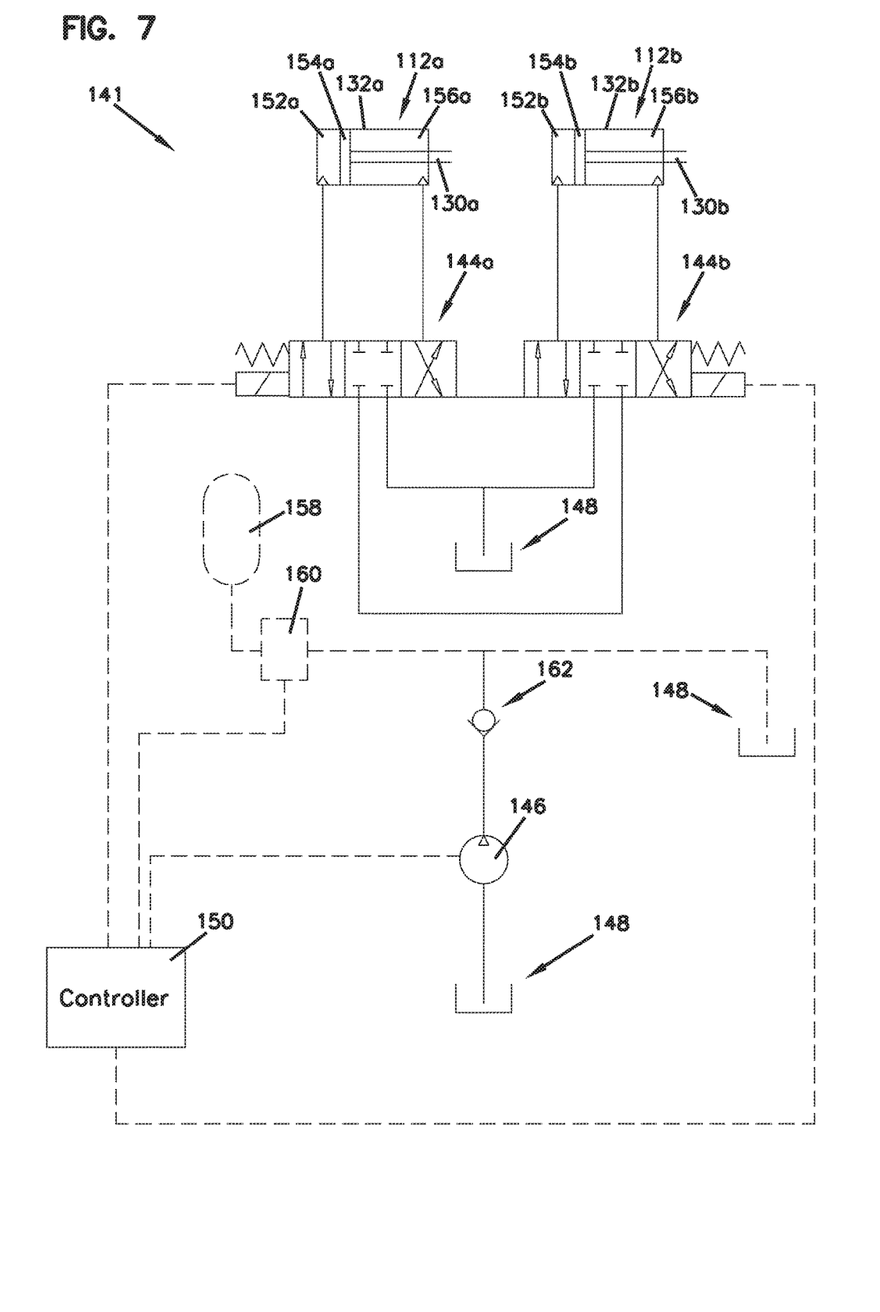
FIG. 7 illustrates a schematic control circuit of the awning of FIG. 1.

FIG. 7 shows an example control circuit 141 for the lift mechanisms 112. In the depicted example, the lift mechanisms 112a, 112b are hydraulic cylinders. The pair of lift mechanisms 112a, 112b are each shown to be in fluid communication with a pair of control valves 144a, 144b. The control valves 144a, 144b are in fluid communication with a pump 146 and a fluid reservoir 148. Further, to control the operation of the circuit 141, a controller 150 is in communication with the control valves 144a, 144b and the pump 146. In some examples, the hydraulic equipment of the circuit 141 can be located adjacent to the awning 100.

In order move the lift cylinders 144a, 144b to the raised position, the controller 150 sends a signal to the pump 146 to begin pumping. At the same time, the controller 150 sends signals to the control valves 144a, 144b to slide into the normal operation (i.e., not reversed flow). Such positioning allows fluid to flow from the pump 146 to a first chambers 152a, 152b of each lift mechanism 112a, 112b, thereby extending the piston rods 132a, 132b due to pressure on a piston 154a, 154b. At the same time, fluid in second chambers 156a, 156b is drained to the reservoir 148.

In order move the lift cylinders 144a, 144b to the lowered position, the controller 150 sends a signal to the pump 146 to begin pumping. At the same time, the controller 150 sends signals to the control valves 144a, 144b to slide into the reversed flow operation. Such positioning allows fluid to flow from the pump 146 to a second chambers 156a, 156b of each lift mechanism 112a, 112b, thereby shortening the lift mechanisms 112a, 112b by forcing the piston rods 130a, 130b back into the cylinders 132a, 132b due to backpressure on a piston 154a, 154b. At the same time, fluid in first chambers 152a, 152b is drained to the reservoir 148.

Alternatively, the circuit 141 can utilize an accumulator 158, an accumulator valve 160 and a check valve 162. The accumulator 158 allows nearly instant pressurized flow fluid, therefore, eliminating time delays associated with building pressure in the circuit 141 by only using a pump.

Further, when used simultaneously with the pump 146, the size of the pump 146 in the circuit 141 can be lowered, thereby saving costs and space. The pump 146 is configured to charge the accumulator 158 when the accumulator valve 160 valve is open. In some examples, the circuit 141 can also include a regeneration circuit (not shown) to charge the accumulator 158 so as to harvest fluid flow from the lift mechanisms 112a, 112b when the lift mechanisms are being lowered from the raised position. The controller 150 can also be connected to the accumulator valve 160 so as to selectively open the valve 160 to provide pressurized fluid flow from the accumulator 156 to the lift mechanisms 112a, 112b while the check valve 162 prevents flow back toward the pump 146. In some examples, fluid flow can be provided to the lift mechanisms 112a, 112b by the accumulator 156 and pump 146 simultaneously.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. An awning comprising:
    an electronic display panel frame having a front end and a rear end, wherein the rear end is pivotally attached to a fixed surface at a pivot location; and
    at least one lift mechanism pivotally connected to the electronic display panel frame and to a fixed mount surface,
    wherein the at least one lift mechanism selectively pivots the electronic display panel frame about the pivot location between a raised position and a lowered position, wherein, when in the raised position, the front end of the electronic display panel frame is positioned at a greater distance from a ground surface than the front end of the electronic display panel frame when positioned in the lowered position.

2. The awning of claim 1, wherein the electronic display panel frame includes a flange configured to attach to the at least one lift mechanism.

3. The awning of claim 1, further comprising a second lift mechanism pivotally connected to the electronic display panel frame and to a ground surface.

4. The awning of claim 1, further compromising a lift mechanism guard, the lift mechanism guard enclosing the lift mechanism.

5. The awning of claim 1, wherein the at least one lift mechanism is at least one of a hydraulic cylinder and pneumatic cylinder.

6. The awning of claim 1, further comprising an electronic display panel mounted to the electronic display panel frame, the electronic display panel including a main body portion and an overhang portion, the overhang portion being positioned at the front end of the electronic display panel frame, hanging away from the main body.

7. The awning of claim 1, wherein, when in the lowered position, the rear end of the electronic display panel frame is positioned at a greater distance from the ground surface than the front end.

8. The awning of claim 1, wherein electronic display panel frame has a tapered width between sides from the front end to the rear end.

9. The awning of claim 1, wherein operation of the at least one lift cylinder is remotely controlled.

10. An awning comprising:
    an electronic display panel having a top side, an underside, a front end, and a rear end, at least the top side being configured to display computer generated media;
    an electronic display panel frame being attached to the underside of the electronic display panel, wherein the electronic display panel frame is pivotally attached to a fixed surface at a pivot location adjacent the rear end of the electronic display panel; and
    a pair of lift mechanisms pivotally connected to the electronic display panel frame at first ends, each lift mechanism being pivotally connected to a fixed mount surface at second ends.

11. The awning of claim 10, wherein the lift mechanisms selectively pivot the electronic display panel about the pivot location between a raised position and a lowered position, wherein, when in the raised position, the front end of the electronic display panel is positioned at a greater distance from the ground surface than when the electronic display panel is positioned in the lowered position.

12. The awning of claim 10, wherein at least the top side of electronic display panel has an anti-glare finish.

13. The awning of claim 10, wherein the electronic display panel is weatherproof.

14. The awning of claim 10, wherein the electronic display panel includes a processor.

15. The awning of claim 10, wherein the lift mechanisms are at least one of hydraulic cylinders and pneumatic cylinders.

16. The awning of claim 10, wherein the electronic display panel includes an overhang portion, the overhang portion being positioned at the front end of the electronic display panel and being configured to display computer generated media.

17. A method of operating an awning comprising:
    positioning an electronic display panel generally horizontal over a ground surface;
    displaying computer generated media on the electronic display panel; and
    pivoting the electronic display panel between a lowered position and a raised position, wherein, when in the raised position, at least a portion of the electronic display panel is positioned at a greater distance from the ground surface than when the electronic display panel is positioned in the lowered position.

18. The method of claim 17, further comprising providing hydraulic lift mechanisms attached to the electronic display panel, and providing fluid flow to the lift mechanisms to move the electronic display panel between the lowered position and the raised position.

19. The method of claim 18, further comprising providing fluid flow from at least one of a hydraulic pump and a hydraulic accumulator to the lift mechanisms.

20. The method of claim 17, wherein the electronic display panel is positioned over a passageway, the passageway including a doorway having a doorway height, further comprising raising the electronic display panel in the raised position to a height equal to or greater than the doorway height.

21. The awning of claim 6, wherein the electronic display panel is weatherproof.

* * * * *